United States Patent [19]

Ratchford

[11] E Re. 28,845

[45] Reissued June 8, 1976

[54] HAND AND FINGER EXERCISER

[76] Inventor: Harry L. Ratchford, 4177 Hubbartt Drive, Palo Alto, Calif. 94306

[22] Filed: Jan. 14, 1974

[21] Appl. No.: 432,891

Related U.S. Patent Documents

Reissue of:

[64] Patent No.: 3,570,849
Issued: Mar. 16, 1971
Appl. No.: 844,818
Filed: July 25, 1969

U.S. Applications:

[63] Continuation of Ser. No. 244,969, Apr. 17, 1972, abandoned.

[52] U.S. Cl. ..... 272/68

[51] Int. Cl.[2] ..... A63B 11/08; A63B 21/14; A63B 23/00

[58] Field of Search ..... 272/67, 68, 82, 83 R; 84/465, 467, 468

[56] References Cited

UNITED STATES PATENTS

| | | | |
|---|---|---|---|
| 318,916 | 5/1885 | Liebig, Jr. | 84/467 |
| 689,652 | 12/1901 | Perry | 272/68 |
| 1,007,410 | 10/1911 | Zachariae | 272/68 |
| 1,010,796 | 12/1911 | Pons | 272/68 |
| 1,620,910 | 3/1927 | Minnich | 272/68 |
| 2,205,161 | 6/1940 | Vick | 272/68 |

*Primary Examiner*—Richard C. Pinkham
*Assistant Examiner*—Harry G. Strappello

[57] ABSTRACT

A hand and finger exerciser comprising a parallel bar inner frame slidably supported for reciprocating movement within the plane of an outer frame to which one of the crossbars of the inner frame is anchored by a plurality of rubber bands. A sleeve rotatably mounted on the opposite parallel crossbar of the inner frame is adapted to be gripped by four fingers of the user's open hand whose palm and thumb engage the adjacent bar of the outer frame. The sleeve rotates as the user closes his hand and thus facilitates natural movements of the fingers for optimum therapeutic exercising of tendons and muscles of the hand and forearm. The uniformly transversely spaced rubber bands are looped over adjacent bars of the inner and outer frames and the ends of each band are looped over an anchor pin on the outer frame for easy removal or attachment by the user without special tools. The inner frame as well as the rubber bands and anchor pins are disposed inside the outer frame, thus resulting in a compact mechanism.

8 Claims, 9 Drawing Figures

INVENTOR.
HARRY L. RATCHFORD

INVENTOR.
HARRY L. RATCHFORD

INVENTOR.
HARRY L. RATCHFORD

INVENTOR.
HARRY L. RATCHFORD

HAND AND FINGER EXERCISER

Matter enclosed in heavy brackets [ ] appears in the original patent but forms no part of this reissue specification; matter printed in italics indicates the additions made by reissue.

*This application is a continuation of Ser. No. 244,969, Apr. 17, 1972 (since abandoned) which was an application for reissue of Pat. No. 3,570,849.*

BACKGROUND OF THE INVENTION

This invention relates to hand exercisers of the type which the user operates by opening and closing his hand against the pull of an elastic tensioning mechanism.

The utility of a hand exerciser is directly related to its capability or efficiency in restoring deteriorated hand and forearm muscles and tendons. The degree and nature of such deterioration which controls the prescribed treatment varies widely from patient to patient and continually changes for each patient during the course of successful treatment. The pull or tension developed by the exerciser mechanism must therefore be changeable by the user or his doctor over a wide range of values and in many increments as the patient improves. For example, a patient recovering from third degree burns on a hand may be capable of exerting only 0.1 to 0.3 ounce of muscular tension with that hand at the outset of treatment and 2.5 to 3 pounds of pull when treatment is complete. In such a case the patient's rate of recovery may require as many as 25 to 30 tension adjustments in the exerciser.

Another measure of the utility of hand exercisers is their capability of uniformly applying a yielding force to their user's fingers while permitting natural movements of the hand as it opens and closes. Proper restoration of hand and arm muscles and tendons requires such natural movements of all parts of the hand. Prior devices with fixed finger grip members have tended to restrain or inhibit the desired curling movement of the hand as it closes, and pivot action exercisers nonuniformly apply a tension force across the hand at any one instant. Such deficiencies in present exercisers become even more significant with severely damaged or deteriorated hands at the beginning of therapeutic treatment when digital movement is weak and small.

A general object of this invention is the provision of a hand exerciser of simple inexpensive construction which is easily adjusted to provide yieldable forces having an extremely wide range of values.

A further object is the provision of a hand exerciser which applies a tension force uniformly to all fingers during opening and closing of the hand.

Still another object is the provision of such an exerciser which facilitates natural movements of the hand as it closes against the applied tension force.

SUMMARY OF THE INVENTION

A plane inner frame is reciprocably rectilinearly movable within the plane of an outer frame and is releasably resiliently coupled across its width to one end of the outer frame by a plurality of parallel rubber bands. Each rubber band is looped over an anchor peg on the outer frame and thus is easily removed or reconnected by the user. The finger grip bar of the inner frame is constructed to permit rotation of the user's fingers as the hand is opened and closed, thus facilitating natural finger movements and inducing uniform tensioning of muscles and tendons.

DETAILED DESCRIPTION OF THE INVENTION

Figure 1:
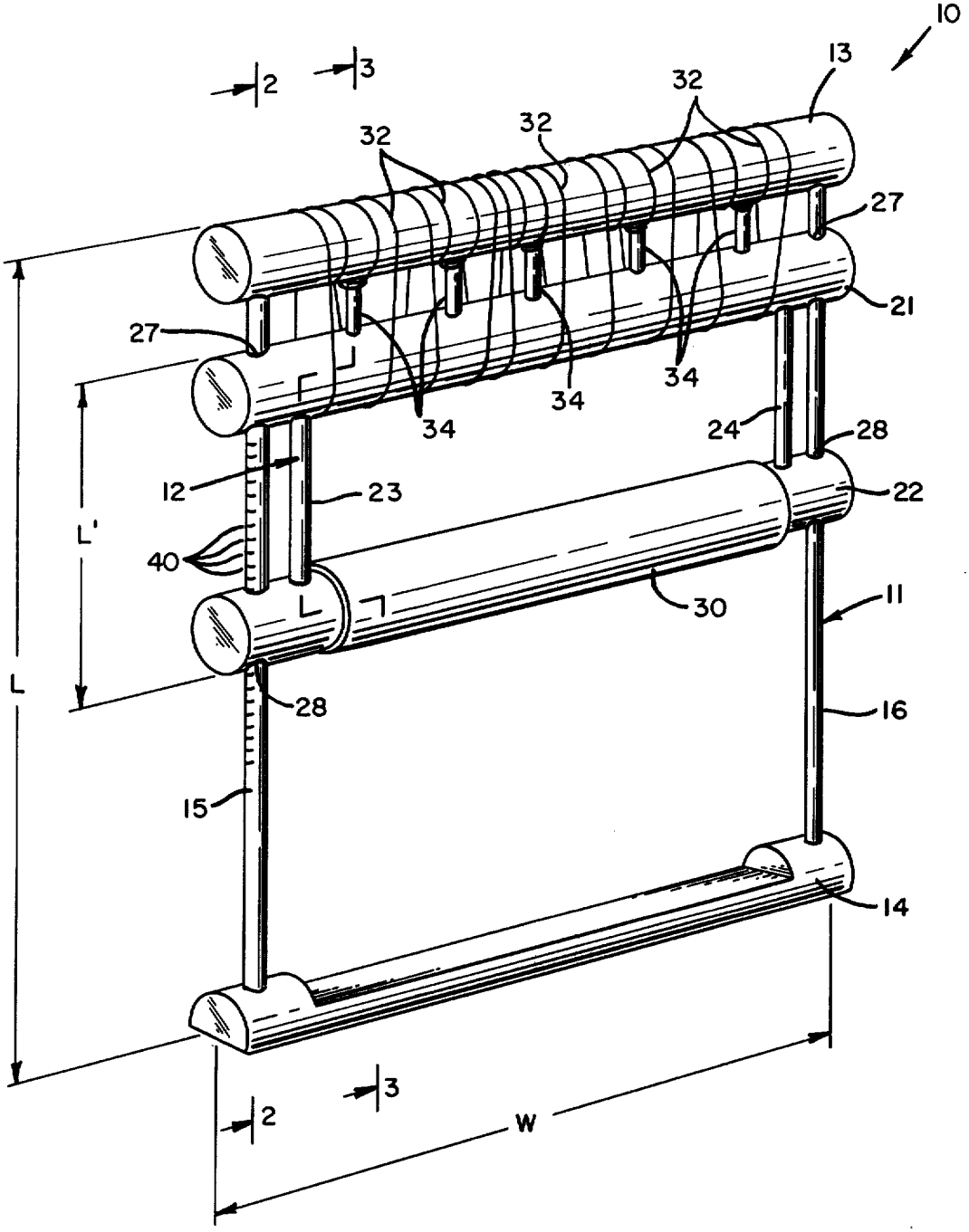
FIG. 1 is a perspective view of a hand and finger exerciser embodying the invention.
Figure 2:
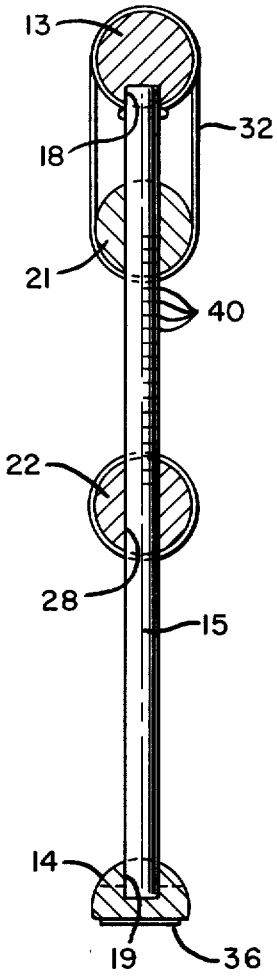
FIG. 2 is a section taken on line 2—2 of FIG. 1.
Figure 3:
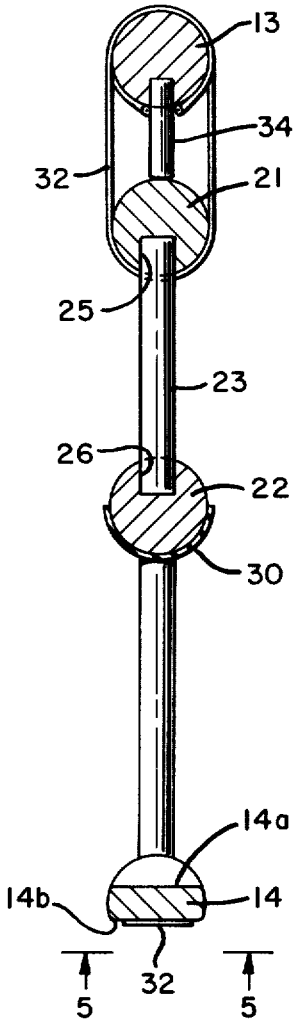
FIG. 3 is a section taken on line 3—3 of FIG. 1.

A hand exerciser 10 embodying the invention comprising a rectangular outer frame 11 and a rectangular inner frame 12 supported within frame 10 for longitudinal reciprocatory movement. Frame 11 comprises longitudinally spaced parallel cross bars 13 and 14 secured to laterally spaced parallel posts 15 and 16 which preferably are press-fitted in recesses 18 and 19 (see FIG. 2) in bars 13 and 14, respectively. Frame 12 comprises cross bars 21 and 22 longitudinally spaced apart a fixed distance by parallel posts 23 and 24 adjacent to and inside outer frame posts 15 and 16, respectively, and secured within recesses 25 and 26 (see FIG. 3) in cross bars 21 and 22, respectively, by suitable means such as cement. Bars 21 and 22 of the inner frame have end openings 27 and 28, respectively, through which outer frame posts 15 and 16 extend with sufficient clearance to permit sliding movement of the inner frame therealong with minimum lateral play.

In order to facilitate natural curling movements of the fingers of the user as his hand is closed into a fist, cross bar 22 of the inner frame preferably is cylindrical and a similarly shaped sleeve 30 is mounted thereon between posts 23 and 24. In a simplified form of the invention, sleeve 30 has an interior diameter slightly greater than the outside diameter of cross bar 22 so as to be free to rotate thereabout. Bearings and other antifriction means between sleeve 30 and bar 22 may be employed to permit relatively uninhibited rotational movement of the sleeve relative to the bar so as to encourage the natural roll of the user's fingers as the fist is formed around bar 14 and sleeve 30.

An important feature of the invention is the uniform distribution of tensioning means across the full width of the exerciser thus insuring the uniform distribution of force across the full width of the user's hand and to all of his fingers. In a preferred form of the invention, the tensioning means comprises a plurality of elastic of rubber bands 32 such as endless bands, which are looped around bars 13 and 21 of the outer and inner frames, respectively. In order to permit relatively easy mounting and dismounting of the rubber bands, anchor pegs 34 are mounted on cross bar 13 and project outwardly therefrom preferably in the plane of outer frame 13 and toward bar 21, i.e., parallel to side posts 15 and 16. Pegs 34 are equally spaced across the span between posts 15 and 16 and are of sufficient length to hold the ends of the rubber bands that are looped around them. In addition, the pegs serve as stops to limit the travel of the inner frame 12 toward bar 13 and prevent an impact of cross bar 21 against the bands.

Figure 6:
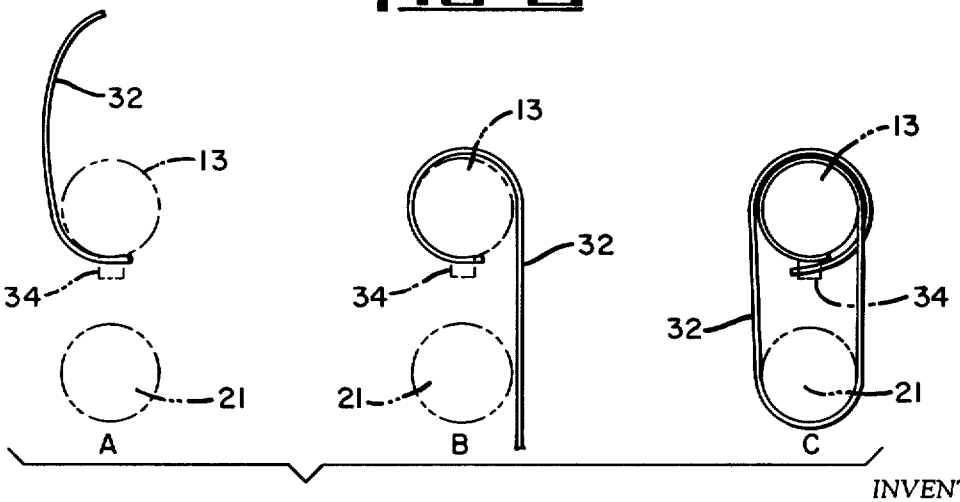
FIGS. 6–A, 6–B and 6–C are schematic diagrams showing the steps of attaching one of the rubber bands to the exerciser.

Each rubber band 32 is mounted on the device as follows: the band is first looped over a peg so as to anchor one "end" of the band to it, see FIG. 6–A. The two strands of the band then, in succession, are wound clockwise as viewed, almost entirely around bar 13, see FIG. 6–B, are wrapped half-way around bar 21 of inner frame 12, and finally are wound again around bar 13 to allow the opposite "end" of the band to be looped over the peg, see FIG. 6–C. Since the portions of the band adjacent both of the anchored ends extend from the peg around bar 13, tensioning of the band during exercising movements of the inner frame 12 serves to lock the band more securely on the peg. In other words, the band is self-locking and can be disengaged only by deliberate action of the user. On the other hand, the technique of attaching or disengaging a band to or from the exerciser is relatively simple and may be achieved by hand with little effort or skill. Thus, the number and/or variety of bands for the exerciser may readily be changed by the user to vary the tension required or desired to follow a prescribed therapeutic program. It should be noted that the bands 32 may be the standard household variety which are not only inexpensive but also are readily available in many sizes so as to permit the user a very wide selection in adapting the exerciser to his particular requirement.

In order to configure the outer frame to more comfortably fit the user's hand, bar 14 has an oval shaped central part with flat inner and outer surfaces 14a and 14b. The outer surface 14b is adapted to rest against the lower portion of the user's palm (or base of the thumb) and the flat shape tends to increase the stability of his grip on the device. If desired, a friction strip 36 of roughened material may be applied to surface 14b to prevent relative movement of the bar 14 on the user's palm.

Figure 4:
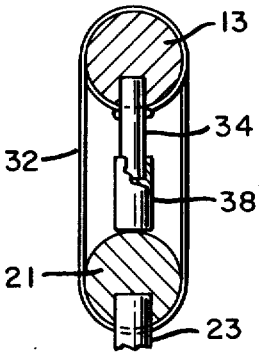
FIG. 4 is a part of a section similar to FIG. 3 showing an extension cap modification for adjusting the grip bar spacing for different hand sizes.
Figure 5:
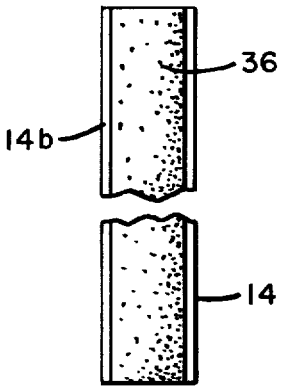
FIG. 5 is a view of the outer surface of the thumb grip bar taken on line 5—5 of FIG. 3.
Figure 7:
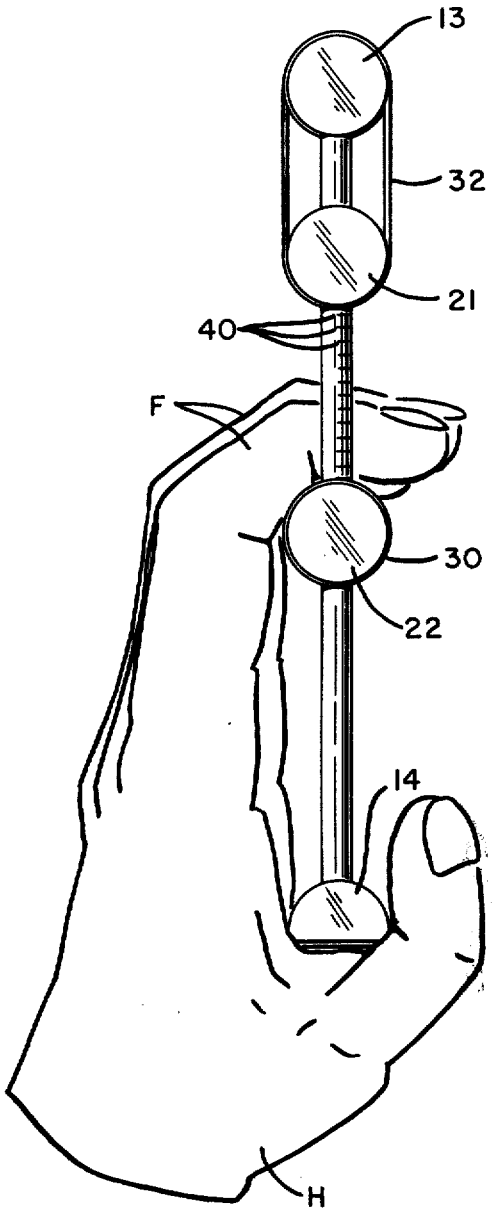
FIGS. 7, 8 and 9 are diagrams of the exerciser as gripped by a user's hand in the fully opened, partially closed and fully closed positions, respectively.
Figure 8:
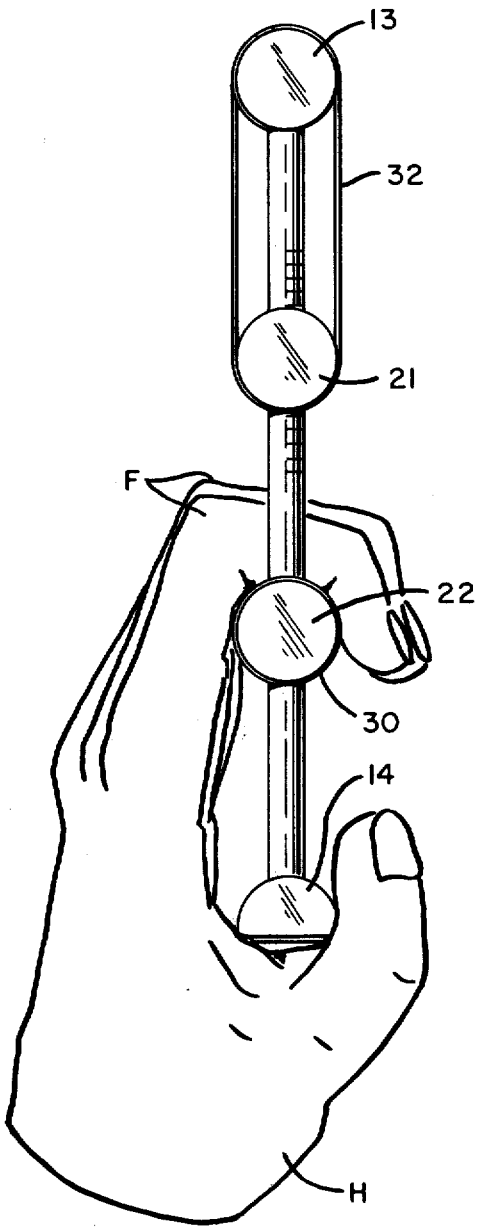
Figure 9:
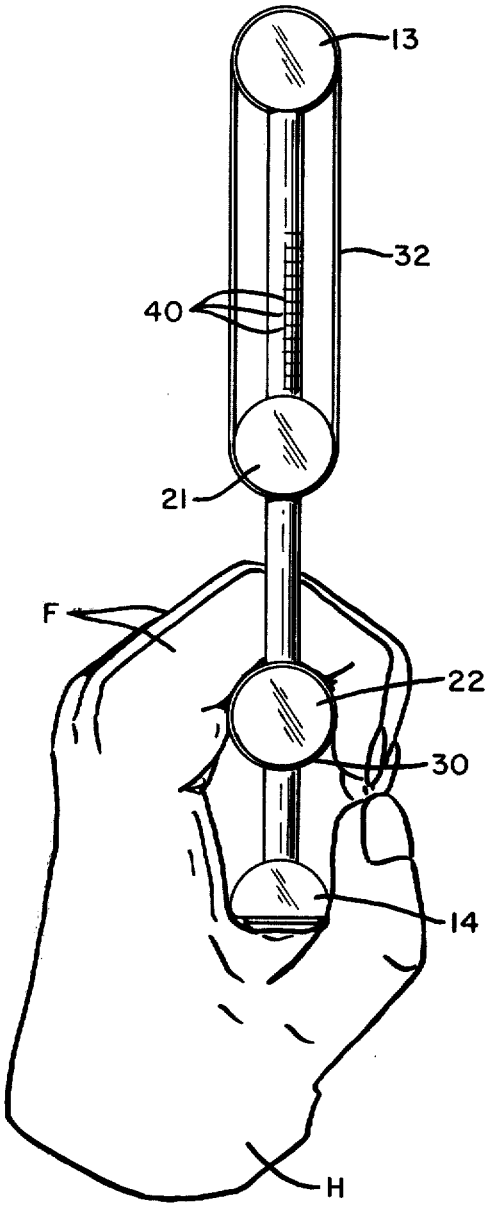

The operation of the exerciser is illustrated in FIGS. 7, 8 and 9. The user's hand H is almost fully opened as shown in FIG. 7 to permit the upper ends of his fingers F to be curled over sleeve 30 on bar 22 and the base of his thumb T to be pressed against the lower surface 14b of bar 14. The spacing between bars 22 and 14 with bar 21 engaging pegs 34 determines the maximum opening of the user's hand at which tension may be applied to the rubber bands by the user's hand. This initial grip spacing may be varied as desired or required by extension caps 38 recessed to fit over one or more pegs 32, see FIG. 4, to better adapt the exerciser for different hand sizes.

As soon as the user begins to close his grip around bars 22 and 14, the inner frame moves away from bar 13 and tension is applied across the width of the hand by bands 32. The tension force is determined, inter alia, by the elasticity of the bands and their length, i.e., the initial tensioning on the bands, which can be varied as desired by the user simply by selection from a supply of bands and installation on the device as described above. Also, the number of bands used may be varied for this purpose. As the grip closes, the fingers F naturally roll about the axis of bar 22 as shown in FIG. 8. Sleeve 30 on bar 22 facilitates this natural finger movement so that the energy of the user is efficiently expended in tensioning the hand rather than in overcoming friction between the fingers and movable frame parts. The finger roll continues until the grip is fully closed as shown in FIG. 9 with the tips of the fingers engaging or nearly engaging bar 14. The inner frame is then allowed to return to the initial position under the tension of the bands.

While movement of the inner frame through its full stroke has been described above as illustrative of one exercising cycle, it will be understood that the full stroke often may be the patient's end objective after a series of treatments extending over a prescribed period of time. Initially, the patient may be able to move the inner frame but a small fraction of the full stroke. As treatment continues, the stroke may gradually lengthen in proportion to success of the treatment and as strength in the hand returns. The exerciser 10 is particularly well adapted to provide the patient and doctor with a precise measurement of such progress through calibrated stroke-length marks 40 on either of posts 15 or 16.

An exerciser 10 embodying my invention has been constructed and successfully tested and has the following physical characteristics:

Length L of outer frame—6"
Width W of outer frame—4.75"
Length L' of inner frame—2.375"
Cross bars 13, 14, 21, 22:
  Material—wood dowel
  Diameter—0.5"
Maximum stroke—2.0"
Weight—4.0 oz.
Tensioning means:
  Length of band—4.125"
  Number of bands—1 to 5

I claim:

1. A hand exerciser comprising
an outer frame having a pair of longitudinally spaced cross bars,
an inner frame supported on and within said outer frame for reciprocative movement in a common plane and having a pair of longitudinally spaced cross bars,
one of the cross bars of said inner frame having a rotatable finger grip thereon,
tensioning means coupling the other cross bar of the inner frame to the adjacent cross bar of the outer frame, and
a plurality of transversely spaced anchor means mounted on one of said coupled cross bars substantially across the width of the inner frame,
said tensioning means comprising
a rubber band for each of said anchor means, each of said bands being looped around the other of said coupled bars and having its opposite ends looped over the same anchor means.

2. The exerciser according to claim 1 in which said one of the cross bars is a cylinder with a predetermined diameter, said finger grip comprising a cylindrical sleeve having a diameter slightly greater than said predetermined diameter.

3. The exerciser according to claim 1 in which said anchor means abut the other of said coupled cross bars at one limit of movement of the inner frame relative to the outer frame, said bands being in tension when the inner frame is at said limit of movement.

4. The exerciser according to claim 3 in which the outer frame cross bar opposite said adjacent cross bar has a flat outer surface, and friction means on said surface.

5. A hand exerciser comprising
an outer rectangular frame having longitudinally spaced cross bars and laterally spaced posts secured to and spacing said cross bars apart, an inner frame having longitudinally spaced cross bars and laterally spaced side posts between said first named side posts and secured to and spacing said inner frame cross bars apart, said inner frame cross bars having aligned openings therein through which said side posts of the outer frame extend, whereby the inner frame is reciprocally movable longitudinally within said outer frame, tensioning means for elastically coupling an outer frame cross bar to the adjacent cross bar of the inner frame, a plurality of laterally spaced pegs mounted on one of said coupled cross bars between and parallel to the outer frame posts, said tensioning means comprising an endless rubber band for each of said pegs, each of said bands being looped around the other of said coupled cross bars with opposite ends of the band anchored on the same peg, the inner frame cross bar opposite the coupled bar of the inner frame being cylindrically shaped and having a predetermined diameter, a cylindrical sleeve rotatably mounted on said cylindrically shaped cross bar whereby the user's fingers on said sleeve tend to roll therewith around the latter cross bar when the hand is closed and opened.

6. The exerciser according to claim 5 with at least three pegs and bands uniformly spaced across the span between the side posts of the outer frame, said pegs abutting the adjacent cross bar at one limit of movement of the inner frame, said bands being in tension when the inner frame is at said limit of movement.

*7. A hand exerciser comprising an outer frame having a pair of longitudinally spaced cross bars with one cross bar adapted to fit in the palm of the hand, an inner frame supported on and within said outer frame for reciprocative movement in a common plane, said inner frame having means defining a pair of longitudinally spaced cross bars,*

*a single elongate, cylindrical, rotatable finger grip carried by said inner frame and mounted for free rotation about the axis of the one of the defined cross bars of said inner frame adjacent said one cross bar of the outer frame,*

*tensioning means coupling the other cross bar of the inner frame to the other cross bar of the outer frame, and*

*a plurality of transversely spaced individual discrete anchor and stop means mounted on one of said coupled cross bars,*

*said tensioning means comprising at least one elastic band looped around the other of said coupled bars and having its ends anchored to said discrete anchor means, said anchor and stop means serving to limit the travel of the inner frame and prevent impact of the other cross bar of the inner frame against the elastic band.*

*8. A hand exerciser comprising an outer rectangular frame having longitudinally spaced cross bars one of which is adapted to fit in the palm of the hand and laterally spaced posts secured to and spacing said cross bars apart,*

*an inner frame having longitudinally spaced cross bars and laterally spaced side posts between said first named side posts,*

*said side posts of said inner frame supporting said inner frame cross bars in spaced apart relation, said inner frame cross bars having openings therein through which said side posts of the outer frame extend, whereby the inner frame is reciprocally movable longitudinally within said outer frame,*

*a single cylindrical sleeve freely rotatable about the one of the cross bars of said inner frame adjacent said one of the cross bars of the outer frame to form a grip to be grasped within all the fingers of a user's hand,*

*tensioning means for elastically coupling the other outer frame cross bar to the other cross bar of the inner frame,*

*a plurality of laterally spaced pegs mounted on one of said coupled cross bars between and protruding toward said adjacent cross bar,*

*said tensioning means comprising*

*at least one elastic band,*

*said elastic band being looped around the other of said coupled cross bars with the ends thereof anchored to the pegs, said pegs additionally serving to limit the travel of the inner frame to prevent impact of the other cross bar of the inner frame against said at least one elastic band.*

* * * * *